(12) United States Patent
Mertens et al.

(10) Patent No.: US 10,543,648 B2
(45) Date of Patent: Jan. 28, 2020

(54) PROCESSING ARRANGEMENT AND A METHOD FOR PRODUCING A FIBER-REINFORCED PLASTIC COMPONENT

(71) Applicants: Volkswagen AG, Wolfsburg (DE); BASF SE, Ludwigshafen am Rhein (DE)

(72) Inventors: Thomas Mertens, Ehra-Lessien (DE); Max Ehleben, Braunschweig (DE); Christine Kunze, Meine (DE); Olaf Täger, Braunschweig (DE); Maurice Bitterlich, Meine (DE); Katja Zeuner, Braunschweig (DE); Philippe Desbois, Edingen (DE); Andreas Wollny, Ludwigshafen (DE)

(73) Assignees: VOLKSWAGEN AKTIENGESELLSCHAFT, Wolfsburg (DE); BASF SE, Ludwigshafen am Rhein (DE)

(\*) Notice: Subject to any disclaimer, the term of this patent is extended or adjusted under 35 U.S.C. 154(b) by 78 days.

(21) Appl. No.: 15/552,939

(22) PCT Filed: Feb. 15, 2016

(86) PCT No.: PCT/EP2016/000252
§ 371 (c)(1),
(2) Date: Aug. 23, 2017

(87) PCT Pub. No.: WO2016/134829
PCT Pub. Date: Sep. 1, 2016

(65) Prior Publication Data
US 2018/0050504 A1 Feb. 22, 2018

(30) Foreign Application Priority Data
Feb. 23, 2015 (DE) .................. 10 2015 002 107

(51) Int. Cl.
*B29C 70/46* (2006.01)
*B29C 70/50* (2006.01)

(52) U.S. Cl.
CPC ............ *B29C 70/465* (2013.01); *B29C 70/50* (2013.01)

(58) Field of Classification Search
CPC ....... B29C 70/386; B29C 70/46; B29C 70/50; B29C 70/465
See application file for complete search history.

(56) References Cited

U.S. PATENT DOCUMENTS 3,166,533 A * 1/1965 Wichterle .............. C08G 69/18
528/312
5,445,701 A * 8/1995 Koba .................... B29C 70/504
100/303
(Continued)

FOREIGN PATENT DOCUMENTS

CN     101062595 A    10/2007
CN     101264667 A     9/2008
(Continued)

OTHER PUBLICATIONS

Schinner, G., J. Brandt, H. Richter, Recycling Carbon-Fiber-Reinforced Thermoplastic Composites, Journal of Thermoplastic Composite Materials, vol. 9 (1996), pp. 239-245. (Year: 1996).*
(Continued)

*Primary Examiner* — Matthew J Daniels
(74) *Attorney, Agent, or Firm* — Pearl Cohen Zedek Latzer Baratz LLP

(57) ABSTRACT

A process arrangement and a process for the production of a fiber-reinforced plastics component made of at least one continuous-fiber-reinforced semifinished textile fiber product with reactive thermoplastic matrix material, where during the manufacture of the semifinished fiber product trimming residues arise, composed of a composite made of fibers (Continued)

and of the reactive thermoplastic matrix material. The trimming residues obtained during the manufacture of the semi-finished fiber product are supplied to a recycling unit for the provision of a recyclate as reactive, as yet unpolymerized starting material for the production of a further component.

7 Claims, 4 Drawing Sheets

(56) References Cited

U.S. PATENT DOCUMENTS

| | | | |
|---|---|---|---|
| 2006/0073311 A1* | 4/2006 | Hogg | B29C 70/386 |
| | | | 428/174 |
| 2015/0144253 A1* | 5/2015 | Zhang | B29C 70/50 |
| | | | 156/148 |

FOREIGN PATENT DOCUMENTS

| | | |
|---|---|---|
| DE | 18 13 980 A | 7/1969 |
| DE | 41 12 172 A1 | 8/1992 |
| EP | 0 443 051 A1 | 8/1991 |
| EP | 2 289 690 A2 | 3/2011 |
| EP | 2 666 805 B1 | 11/2013 |
| WO | WO 2003/053661 A1 | 7/2003 |
| WO | WO 2011/056293 A1 | 5/2011 |
| WO | WO 2012/116947 A1 | 9/2012 |
| WO | WO 2013/056845 A2 | 4/2013 |

OTHER PUBLICATIONS

Search report for German Patent Application No. 10 2015 002 107.9, dated Jun. 7, 2015.
International Search Report of PCT Application No. PCT/EP2016/000252, dated Jun. 13, 2016.
Office Action for Chinese Patent Application No. 201680011481.3, dated Mar. 1, 2019.

* cited by examiner

PROCESSING ARRANGEMENT AND A METHOD FOR PRODUCING A FIBER-REINFORCED PLASTIC COMPONENT

CROSS-REFERENCE TO RELATED APPLICATIONS

This application is a National Phase Application of PCT International Application No. PCT/EP2016/000252, International Filing Date Feb. 15, 2016, claiming priority of German Patent Application No. 10 2015 002 107.9, filed Feb. 23, 2015, which is hereby incorporated by reference in its entirety.

FIELD OF THE INVENTION

The invention relates to a process arrangement for the production of a fiber-reinforced plastics component, and also to a process for the production of this plastics component.

BACKGROUND OF THE INVENTION

The fiber-reinforced plastics components can be produced with the aid of semifinished textiles products known as prepregs. Reactive prepregs are produced by preimpregnating a textile fiber material with a reactive, i.e. as yet unpolymerized, thermoplastic matrix material at a temperature lower than a polymerization-initiation temperature. The fiber-reinforced plastics component is shaped by mutually superposing the prepregs in a stack to give a layer package in a lay-up procedure and subjecting them to a thermoforming process or press process.

WO 2012/116947 A1 discloses a process of this generic type for the production of reactive prepregs, i.e. of continuous-fiber-reinforced semifinished sheet products with polyamide matrix. The process begins by preimpregnating textile structures with a liquid starting component of the polyamide matrix, i.e. molten lactam inclusive of added catalysts and/or activators, and specifically in a continuous process. After impregnation, the preimpregnated continuous textile structure is trimmed to size in a cutting unit to give fiber-reinforced semifinished sheet products and mutually superposed in a stacking unit to give a stack. In the further course of the process, the preimpregnated semifinished textile products are transported to an assembly unit in which the semifinished textile products are mutually superimposed in a lay-up procedure and are cut to size in accordance with the final shape of the required component. The resultant layer package is then placed in a mold. Shaping then takes place, and specifically at a temperature above the polymerization-initiation temperature in a press procedure or thermoforming procedure. The preimpregnated lactam thus polymerizes to give a polyamide. The simultaneous thermoforming/pressing converts the fiber-reinforced semifinished sheet product into the intended shape of the required component finishing.

Final trimming of the finished plastics component can then take place in a finishing unit, specifically with formation of final-trimming residues, composed of a composite of fibers and of the polymerized matrix material. The final-trimming residues can be delivered to a recycling unit, and can be further processed there to give a recyclate for uses in an injection-molding or press process, as indicated by way of example in EP 2 666 805 B1. Accordingly, it is possible, by simple comminution and extrusion, to introduce components based on a thermoplastic matrix into new uses in the injection-molding sector, for example. The fundamental advantage of fiber-composite materials based on a thermoplastic matrix here consists in excellent recycling properties. Simple melting and regranulation results in homogeneous mixing of the fibers and the matrix. The resultant recycled granulate can be reused as a high-quality feedstock for a very wide variety of applications.

The problematic part of the process sequence outlined above is that residues—additional to the final-trimming residue mentioned—are also produced at earlier junctures in the process: edge-trimming residues (from the trimming-to-size of the semifinished fiber products) and assembly-trimming residues. Unlike the final-trimming residue, the edge-trimming residues and the assembly-trimming residues have not yet been polymerized, and cannot therefore be further processed in the abovementioned recycling process. The edge-trimming residues and assembly-trimming residues are therefore diverted from the process sequence as non-recyclable waste material.

SUMMARY OF THE INVENTION

The object of the invention consists in providing a process arrangement, and also a process, which can produce a fiber-reinforced plastics component and which, in comparison with the prior art, involves an improved recycling concept.

The object of the invention has been achieved via the features of the independent claims. The dependent claims disclose preferred embodiments of the invention.

DETAILED DESCRIPTION OF THE INVENTION

According to the invention, the process arrangement comprises a recycling unit into which the trimming residues made of the composite of fibers and of reactive thermoplastic matrix material can be supplied. On the basis of the trimming residues, the recycling unit provides a recyclate which serves as a reactive, as yet unpolymerized starting material for the production of a component or the functionalization of a component, by means of rib structures, for example.

In one preferred variant embodiment, a shaping station may be assigned to the process arrangement, this shaping station being the venue for production of the component with polymerization of the recyclate as a consequence of introduction of heat. A relevant point in respect of fully satisfactory polymerization in the shaping unit is that the recyclate that has not yet been polymerized does not come into contact with the environment, i.e. does not undergo reaction with atmospheric moisture, oxygen, UV radiation or the like that would impair its processability, in particular the polymerization reaction. In order to avoid any such disadvantageous reaction with the environment, the recyclate can be dried and/or stored under conditions that exclude air, light and/or moisture until it is polymerized.

In one technical implementation, the shaping unit may comprise an extruder or a metering facility, in which the recyclate can be melted to above its melting temperature but below its reaction temperature. The melted recyclate is introduced by means of the extruder or the metering facility into the mold cavity of a shaping mold, which is heated to a temperature above the reaction temperature. Introduction into the mold heated to the reaction temperature may be accomplished, for example, via the die of an injection-molding assembly or via the injection head of a metering system, into an open or closed shaping mold.

Besides introduction into the closed or open mold (for example LFT pressing operation with reactive matrix), other methods are also conceivable, an example being the injection-compression molding of the recyclate.

As an alternative to this, the recyclate, without prior melting, can be introduced in the solid aggregate state into the mold cavity of the shaping mold of the shaping unit. In this case, the recyclate, for example, may be melted, distributed in the mold cavity, and polymerized therein only when the mold cavity of the shaping mold is closed. Combination with other shaping processes is conceivable, as for example with pressing processes of continuous-fiber-reinforced cast PA prepregs. An example that may be mentioned is the in-mold injection molding or in-mold compression molding of short-fiber-reinforced cast PA ribs from reactive recyclate.

The size of the trimming residues passed to the recycling unit may be such that before being processed further as recyclate, they are comminuted, for example, in a cutting mill. After the comminuting operation, preferably, the trimming residues have an adjustable, uniform fiber length (short fibers to long fibers). As already indicated above, it is necessary, for the purpose of avoiding contamination of the reactive matrix material with atmospheric moisture, for the interim storage of the trimming residues before and after comminution, and for the cutting mill operation itself, to take place in a dry atmosphere.

In comparison to the fiber volume fraction of the required component, the trimming residues supplied to the recycling unit may have an increased fiber volume fraction. Against this background, depending on the required fiber volume content of the recyclate, a reactive matrix material and/or optionally additives, such as thickeners, may be able to be added to the trimming residues passed into the recycling station.

In a manufacturing plant, at least one continuous web made of a textile structure can be preimpregnated with a liquid starting component of the reactive, thermoplastic matrix material in a manufacturing unit in a continuous process. After impregnation, edge-trimming takes place in which the preimpregnated continuous structure is trimmed to size in a cutting unit to give the continuous-fiber-reinforced semifinished textile fiber products (prepregs) with reactive, i.e. as yet unpolymerized, thermoplastic matrix material. The trimming to size takes place with formation of edge-trimming residues, composed of a composite made of fibers and of reactive thermoplastic matrix material. For reasons related to manufacturing technology, the fibers in the edge-trimming residues have not been completely wetted by the matrix material. Indeed, matrix material may be entirely absent in some parts of the edge-trimming residues. Accordingly, the proportion of fiber in the edge-trimming residues is very high.

In the further course of the process, the prepregs are mutually superposed in a stacking, to give a stack, and stored, and transported as required to an assembly unit. In the assembly unit, the prepregs are mutually superposed in layers to give a layer package in a lay-up procedure. An assembly trimming procedure can then take place in which the layer package is cut to size in accordance with a final shape of the fiber-reinforced plastics component. Assembly-trimming residues are produced in the process, composed of a composite made of fibers and of reactive thermoplastic matrix material. Unlike the edge-trimming residues, the assembly-trimming residues are completely surrounded by matrix material, i.e. fully impregnated, and the proportion of fiber corresponds to that in a finished fiber-reinforced plastics component.

Reactive thermoplastic matrix material used is preferably caprolactam (known as casting PA). Examples of reactive thermoplastic matrix system rather than caprolactam are laurolactam and cyclic butylene terephthalate, etc. Fiber material can be any of the possible fibers. It is preferable to use fibers made of glass, carbon, basalt, aramid, or to use a combination of these. The arrangement of these can vary greatly, examples being woven fabric, laid scrim and a unidirectional material. Polymerization of caprolactam uses a reaction temperature of about 150° C., at which caprolactam produces the polyamide (PA6). For other reactive materials, for example laurolactam giving PA12 or CBT giving PBT, temperatures appropriate to the respective material must be selected.

The advantageous inventive embodiments explained above and/or provided in the dependent claims can—except when by way of example there are clear dependencies or there are alternatives that cannot be combined—be used individually or in any desired combination with one another.

BRIEF DESCRIPTION OF THE DRAWINGS

The invention and its advantageous embodiments, and also advantages thereof, are explained in more detail below with reference to drawings.

DETAILED DESCRIPTION OF THE INVENTION

Figure 1:
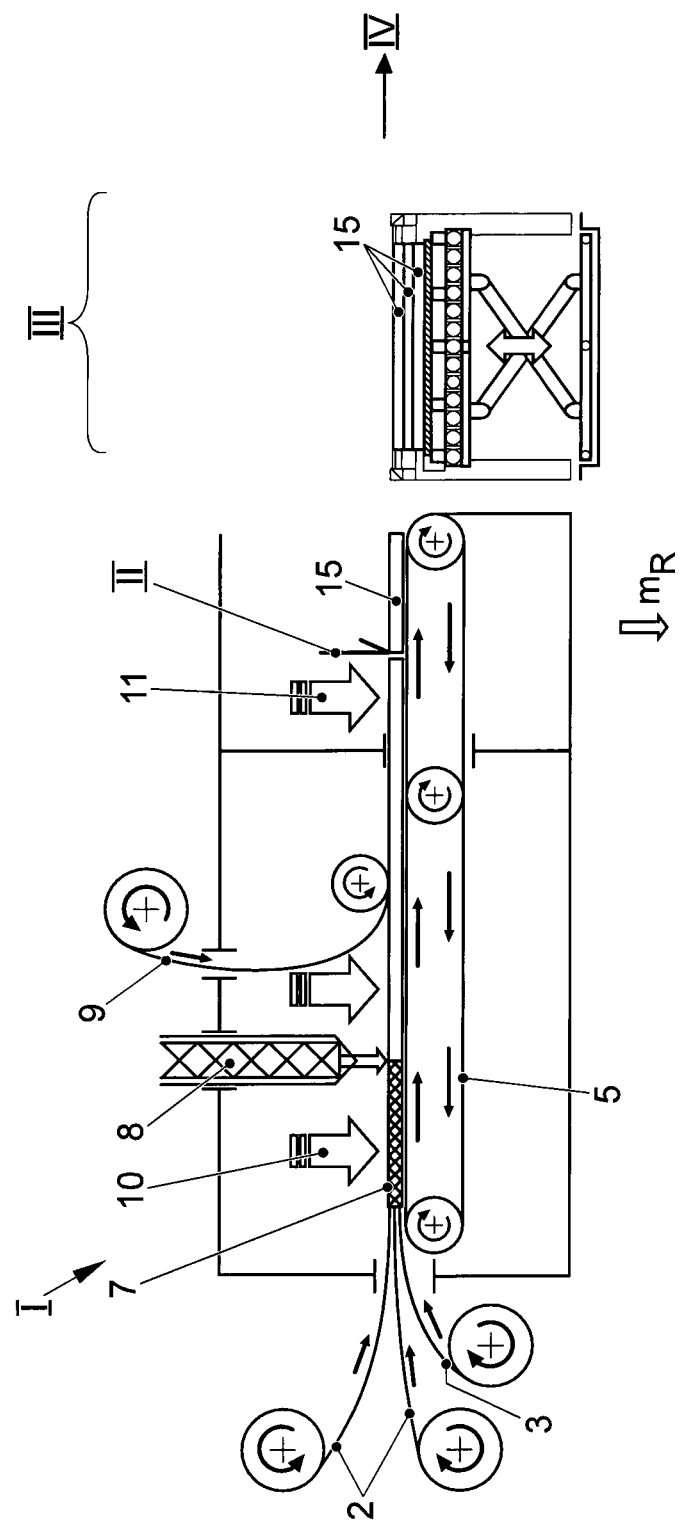
FIG. 1 to 4 in each case show process units for the production of the fiber-reinforced plastics component.

FIGS. 1 to 4 depict the process units I to VI for the production of a fiber-reinforced plastics component 1 (FIGS. 3 and 4) to the extent required for understanding the invention. Accordingly, a manufacturing unit I first by way of example brings two fiber layers 2 onto a continuous transport belt 5 in a continuous process with insertion therebetween of a first film 3 made of, for example, polyamide or of another suitable material. The resultant textile layer structure 7 is saturated with a starting component 8 of a reactive thermoplastic matrix material, for example lactam, and specifically with exposure to heat 10 at a temperature below the initiation temperature for polymerization of the starting component of the reactive thermoplastic matrix material. The films 2 and 9 shown in FIG. 1 are depicted in a purely exemplary manner and are not required for realizing the invention.

In the further course of the process, a second film 9 is also then applied, and the textile layer structure 7 is cooled in a cooling unit 11 (i.e. consolidated), and also trimmed to size in a downstream cutting unit II to give individual preimpregnated semifinished textile fiber products 15. In the cutting unit II, edge trimming takes place in which the prepregnated continuous structure 7 is cut to size to give the continuous-fiber-reinforced semifinished textile fiber products 15 (for which the term prepregs is also used below). An edge-trimming residue $m_R$ is thus produced, composed of a composite made of fibers and of reactive (i.e. as yet unpolymerized) thermoplastic matrix material. The edge-trimming residue $m_R$ is diverted from the process sequence as waste material. The fibers in the edge-trimming residue $m_R$ have not been completely wetted by the reactive matrix material, or are present in the absence of any matrix material, the proportion of fiber in the edge-trimming residue $m_R$ therefore being very high.

Figure 2:
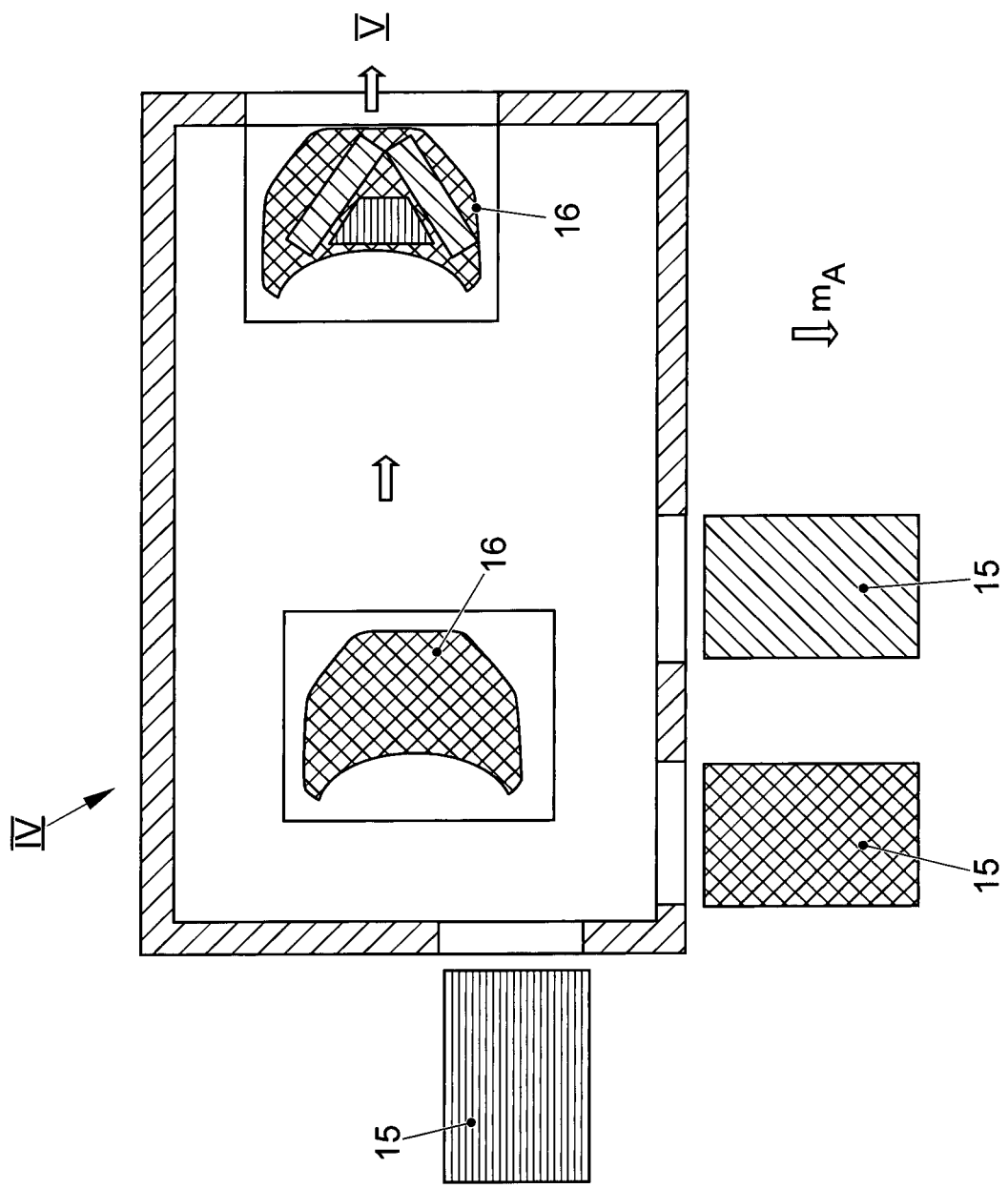

The trimmed-to-size semifinished textile fiber products 15 are mutually superposed in a subsequent stacking unit III to give a stack, and are stored. The semifinished fiber products 15 mutually superposed in a stack are transferred as required to an assembly unit IV, which is downstream in the process and is indicated in FIG. 2. In the assembly unit IV, the preimpregnated semifinished textile fiber products 15 are cut to size and mutually superposed in layers to form a layer package 16 (FIG. 2). The prepreg 15 mutually superposed in layers in the layer package 16 are moreover cut to size in accordance with the loading requirements and geometrical demands placed upon the finished plastics component 1. This results in further waste material, which is diverted from the process sequence as assembly-trimming residue $m_A$. The assembly-trimming residue $m_A$ is composed of a composite made of fibers and of reactive thermoplastic matrix material. The fibers in the assembly-trimming residue $m_A$, unlike those in the edge-trimming residue $m_R$ are completely surrounded by matrix material, i.e. are fully impregnated. The proportion of fiber in the assembly-trimming residue $m_A$ is therefore lower than in the edge-trimming residue $m_R$ and in essence is the same as the proportion of fiber in the finished plastics component 1.

Figure 3:
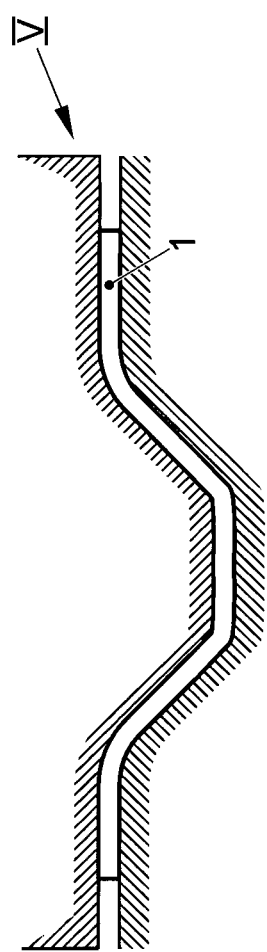
Figure 4:
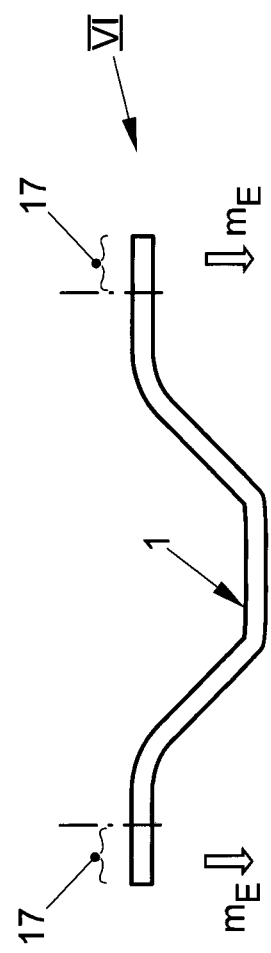

In the further course of the process, the layer package 16 is transferred to the press unit and/or thermoforming unit V indicated in broad terms in the diagram of FIG. 3, in which the layer package 16 is heated to a temperature above the polymerization temperature and at the same time is thermoformed/pressed to give the shape of the required plastics component 1. In a finishing unit VI (FIG. 4), which is downstream in the process, the plastics component 1 is subjected to edge-trimming in which by way of example an exterior component edge 17 required for the thermoforming procedure is removed from the plastics component 1, and specifically with formation of a final-trimming residue $m_E$, composed of a composite made of fibers and of polymerized matrix material.

Figure 5:
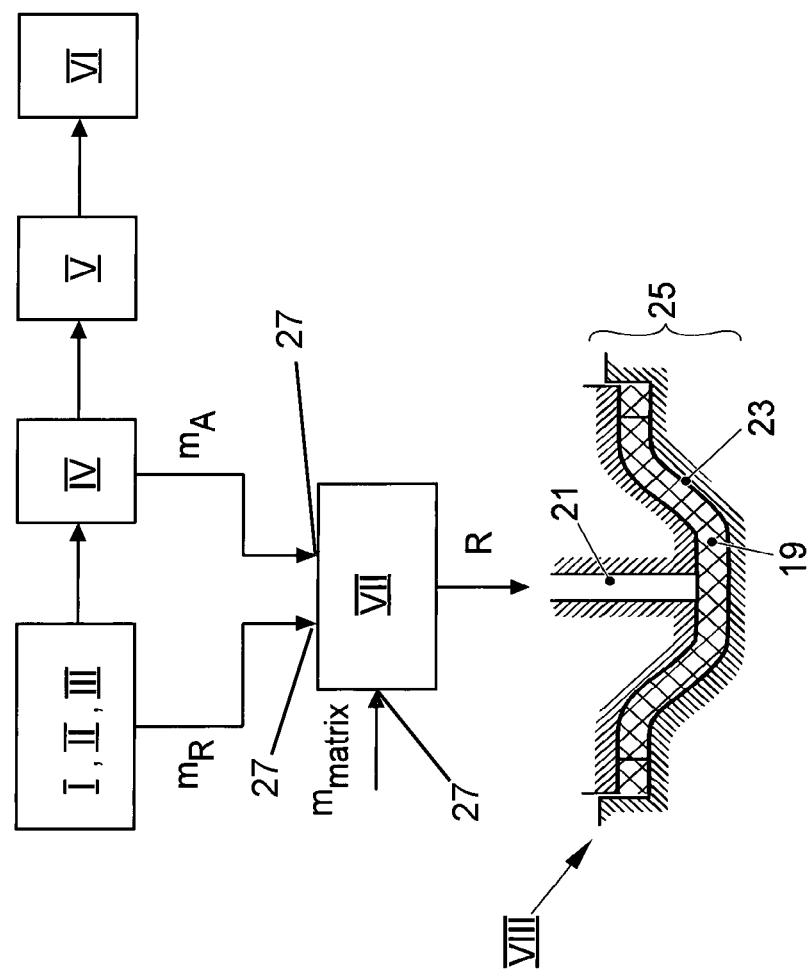
FIG. 5 is a block diagram of the process sequence inclusive of a recycling unit.

Associated with the process sequence I to VI for the production of the plastics component 1 in FIG. 5 there is a recycling unit VII into which the edge-trimming residues and assembly-trimming residues $m_R$, $m_A$, that have not yet been polymerized, are passed. In the recycling unit VII there can, where appropriate, be a granulator arranged which comminutes the trimming residues $m_R$, $m_A$ to predetermined fiber lengths. In the recycling unit VII, the trimming residues $m_R$, $m_A$ are brought together to form a recyclate R, which consists of the composite of fibers and of reactive thermoplastic matrix material, and that forms a reactive, as yet unpolymerized starting material for the production of a further component 19.

As is apparent from FIG. 5, there is a shaping unit VIII downstream of the recycling unit VII, and the component 19 is produced in this unit VIII, with polymerization of the recyclate R as a result of introduction of heat. In the technical embodiment, the shaping unit VIII may have a metering facility 21, which is merely indicated, and in which the recyclate R is melted to above its melting temperature but still below its reaction temperature. The melted recyclate R is introduced by means of the metering facility 21 into the mold cavity 23 of a shaping mold 25, which is heated to a temperature above the reaction temperature. In other words, after introduction has taken place, the melted recyclate R is polymerized in the mold cavity 23.

The recycling unit VII in FIG. 5, moreover, comprises a feed element 27, for a reactive matrix material $m_{matrix}$ and/or, optionally, additives, such as thickeners, to be supplied to the trimming residues $m_A$, $m_R$ in the recycling unit VII. In this way it is possible to adapt the required fiber volume content of the component 19 that is to be produced.

The invention claimed is:

1. A process arrangement for the production of a fiber-reinforced plastics component, comprising:
    a manufacture and assembly unit for the provision of at least one continuous-fiber-reinforced semifinished textile fiber product with reactive thermoplastic matrix material, with formation of trimming residues made of a composite of fibers and of the reactive thermoplastic matrix material,
    a cutting unit, wherein the manufacture and assembly unit and cutting unit comprise a continuous transport belt on which:
        the manufacture and assembly unit preimpregnates at least one continuous web made of a texture structure with a liquid starting component of the reactive thermoplastic matrix material in the manufacturing unit in a continuous process, and
        after impregnation, the cutting unit performs edge-trimming in which the preimpregnated continuous structure is cut to size to give the continuous-fiber-reinforced semifinished textile fiber product with reactive thermoplastic matrix material, with formation of an edge-trimming residue, composed of the composite of fibers and of reactive thermoplastic matrix material,
    wherein the manufacture and assembly unit comprises a cooling unit upstream from the cutting unit,
    a press unit and/or thermoforming unit in which the continuous-fiber-reinforced semifinished textile fiber product with reactive thermoplastic matrix material is heated to a temperature above the polymerization temperature and at the same time can be pressed and/or thermoformed into the shape of the required plastics component, and
    a recycling unit into which the trimming residues made of the composite of fibers and of reactive thermoplastic matrix material can be supplied for the provision of a recyclate as reactive, as yet unpolymerized starting material for the production of a further component or for the functionalization of the component.

2. The process arrangement according to claim 1, further comprising a shaping unit in which the component is produced with polymerization of the recyclate as a result of introduction of heat.

3. The process arrangement according to claim 2, wherein the shaping unit comprises an extruder or a metering facility in which the recyclate can be melted to above its melting temperature but below its reaction temperature, and the melted recyclate can be introduced by means of the extruder or the metering facility into a shaping mold which is heated to a temperature above the reaction temperature.

4. The process arrangement according to claim 2, wherein the recyclate, without prior heating to above its melting temperature, can be introduced in the solid aggregate state into a mold cavity of the shaping mold of the shaping unit, and the recyclate is melted, distributed in the mold cavity, and polymerized therein only when the mold cavity of the shaping mold is closed.

5. The process arrangement according to claim 1, wherein the recycling unit comprises a comminuting assembly, in which the supplied trimming residues can be comminuted to specified fiber lengths.

6. The process arrangement according to claim 3, wherein a reactive matrix material and/or optionally additives can be added to the trimming residues passed into the recycling unit.

7. The process arrangement according to claim 1, wherein, in the assembly unit, the continuous-fiber-reinforced semifinished textile fiber products can be mutually superposed in layers to give a layer package in a lay-up procedure, or assembly trimming takes place in which the semifinished fiber product can be trimmed to size in accordance with a final shape of the fiber-reinforced plastics component, with formation of an assembly-trimming residue composed of the composite made of fibers and of reactive thermoplastic matrix material.

\* \* \* \* \*